(12) United States Patent
Witzgall et al.

(10) Patent No.: US 7,103,537 B2
(45) Date of Patent: Sep. 5, 2006

(54) SYSTEM AND METHOD FOR LINEAR PREDICTION

(75) Inventors: Hanna Elizabeth Witzgall, Arlington, VA (US); Jay Scott Goldstein, Centerville, VA (US)

(73) Assignee: Science Applications International Corporation, San Diego, CA (US)

( * ) Notice: Subject to any disclaimer, the term of this patent is extended or adjusted under 35 U.S.C. 154(b) by 766 days.

(21) Appl. No.: 09/974,091

(22) Filed: Oct. 10, 2001

(65) Prior Publication Data

US 2002/0065664 A1    May 30, 2002

Related U.S. Application Data

(60) Provisional application No. 60/239,931, filed on Oct. 13, 2000.

(51) Int. Cl.
*G10L 19/04* (2006.01)
*G06F 17/10* (2006.01)

(52) U.S. Cl. .................. 704/219; 704/708; 704/300
(58) Field of Classification Search ............... 704/201; 395/2.28; 364/577; 342/179
See application file for complete search history.

(56) References Cited

U.S. PATENT DOCUMENTS

| | | | |
|---|---|---|---|
| 5,517,122 A | 5/1996 | Chen | |
| 5,586,066 A | 12/1996 | White et al. | |
| 5,673,210 A | 9/1997 | Etter | |
| 5,708,754 A | 1/1998 | Wynn | |
| 5,774,839 A | 6/1998 | Shlomot | |
| 6,032,113 A | 2/2000 | Graupe | |
| 6,130,641 A * | 10/2000 | Kraeutner et al. | 342/179 |
| 6,157,403 A | 12/2000 | Nagata | |
| 6,188,352 B1 | 2/2001 | Choi et al. | |
| 6,201,954 B1 | 3/2001 | Soliman | |
| 6,219,561 B1 | 4/2001 | Raleigh | |
| 6,236,862 B1 | 5/2001 | Erten et al. | |
| 6,239,746 B1 | 5/2001 | Pipon et al. | |
| 6,256,494 B1 | 7/2001 | Lopes et al. | |
| 6,263,307 B1 | 7/2001 | Arslan et al. | |
| 6,278,961 B1 | 8/2001 | Kadtke et al. | |

(Continued)

OTHER PUBLICATIONS

Jeng-Kuang et al., An efficient algorithm and pipelined VLSI architecture for the maximum likelihood estimation of directions of arrival 1990, IEEE Internation Conference, pp. 2919-2922.*

(Continued)

*Primary Examiner*—David Hudspeth
*Assistant Examiner*—Brian L. Albertalli
(74) *Attorney, Agent, or Firm*—Kilpatrick Stockton LLP

(57) ABSTRACT

In a digital signal processor (DSP), input data is configured as a data matrix comprising data samples collected from an input signal. A weight vector is applied to the data matrix, where the weight vector comprises three parts including (a) a rank reduction transformation produced by decomposition of the data samples in a multistage Wiener filter having a plurality of stages, each stage comprising projection onto two subspaces. Each subsequent stage comprises projecting data transformed by the preceding second subspace onto each of a first subspace comprising a normalized cross-correlation vector at the previous stage and a second subspace comprising the null space of the normalized cross-correlation vector of the current stage, to form a reduced rank data matrix. Part (b) of the weight vector comprises minimizing the mean squared error in the reduced rank data space. The output is a linear estimate of the input data. In one embodiment, further processing produces an estimate of the power spectral density of the input signal.

55 Claims, 10 Drawing Sheets

U.S. PATENT DOCUMENTS 6,295,520 B1    9/2001  Tian

OTHER PUBLICATIONS

Knockaert, A recursive algorithm for linear system identification Jun. 1986, IEEE Trans, vol. 34, Issue: 3, pp. 492-498.*

Schneider et al., A Krylov subspace method for large estimation problems Mar. 1999, IEEE International Conference, vol. 3, pp. 1701-1704.*

Camps et al., Radiometric sensitivity computation in aperture synthesis interferometric radiometry, IEEE Trans, vol. 36, pp. 680-685.*

J. Scott Goldstein, Senior Member, IEEE, Irving S. Reed, Fellow, IEEE, and Louis L. Scharf, Fellow IEEE A Multistage Representation of the Wiener Based on Orthogonal Projections, IEEE Transactions on Information Theory, vol. 44, No. 7, Nov. 1998, p. 2943.

J.S. Goldstein, J.R. Guerci and I.S. Reed, Reduced-Ran Intelligent Signal Processing with Application to Radar, Intelligent Signal Processing, 2001, p. 465, IEEE Press, New York.

Preliminary Examination Report for Application No. PCT/US01/42582, dated May 28, 2002 (mailing date).

* cited by examiner

SYSTEM AND METHOD FOR LINEAR PREDICTION

This application claims priority to U.S. provisional application Ser. No. 60/239,931, filed Oct. 13, 2000, the disclosure of which is incorporated herein in its entirety by reference.

BACKGROUND

Linear prediction is well known for processing of signals in a number of applications. Using this method, the $p+1^{th}$ sample of a signal is predicted by forming a linear combination of p previous samples of the signal. The linear combination is usually optimized by minimizing the square of the prediction error. One of the most widely used models for linear prediction is the autoregressive (AR) model.

Perhaps the most widely recognized application of linear prediction is in the area of audio or speech coding, where an incoming signal stream is digitized, then samples of the digitized signal are processed by a variable linear predictive filter to determine relationships in the signal in order to calculate, i.e., predict, the value of the next output sample. This process of identifying model parameters corresponding to the signal permits the data in the signal to be compressed for faster transmission and also provides means for removing a significant amount of noise from the original received signal. Upon receipt of the transmission, the sound is regenerated using a sound synthesizer, which uses an excitation signal and information included in the transmission about the filter coefficients to restore the audio signal less any suppressed noise. Linear prediction has also been used in image processing and modeling of complex systems, including stock market analysis.

Linear prediction can be analyzed in the time or frequency domain. An important application of linear prediction is as a method of spectrum estimation. Generally, spectrum estimation techniques are used to extract useful data from a signal which also contains noise and/or interference. Specifically, spectrum estimation is a problem that involves estimating the power spectrum from a finite number of noisy measurements. "Useful data" includes not only information that may be encoded in the signal, but also characteristics of the signal itself, such as direction and delay, permitting signal detection and tracking. Thus, "useful data" is any information that is determinable from the signal. Such techniques also may be used for interpolation or extrapolation of missing portions of a signal. One exemplary application is in the area of wireless communication systems, where co-channel interference can be severe. Techniques which have been employed for increasing the signal level of the primary communication path include directive antennas at base station sites and adaptive beamforming, in which a phased antenna array is used to account for various angles between the base station and a remote user. While beamforming to a fixed location over a line of sight may be performed with relative ease, the task of transmitting to a mobile user over a time-varying multipath is more difficult. An adaptive transmit beamforming approach determines the angle of departure (AOD) at which energy is to be transmitted for the base station antenna array to a given remote user. Each AOD corresponds to one of the signal paths of the multipath channel, and is determined by estimating each angle of arrival (AOA) at the base station of signal energy from the user using a spectrum estimation technique. A transmit beam form is adaptively formed to maximize the signal level along each desired AOD while minimizing the radiation projected at all other angles. Several well known types of high-resolution or "super-resolution" methods, e.g., MUSIC, ESPRIT, Maximum likelihood and WSF, may be used to estimate an AOA spectrum in the presence of several signal sources for purposes of determining AOD.

Spectrum estimation has also been used for estimating time of arrival (TOA) which has applications in geolocation, e.g., triangulation. Super-resolution techniques such as MUSIC and root MUSIC have been used to provide significant improvement in resolution for TOA estimates. (See, e.g., U.S. Pat. No. 5,890,068, "Wireless Location System", the disclosure of which is incorporated herein by reference.) TOA alone or in combination with AOA can be used for bearing estimation for sonar and radar applications (which utilize beamforming methods) and in synthetic aperture radar (SAR) imaging applications. Spectral estimation is also widely used in analytical methods including chromatographic and spectrographic analysis of materials, where multiple channels of data are contained within a measured spectrum and regression models are used to extract relevant data from irrelevant data and noise.

Because there are so many spectrum estimators, it is useful to compare a potential estimator to a theoretical limit given by the Cramer-Rao bound (CRB). The CRB gives the lower bound on the variance of the estimated parameter for unbiased estimators. For a single frequency in white noise, the conventional discrete Fourier transform (DFT) can achieve the CRB. For multiple, closely spaced frequencies, the DFT can no longer resolve the frequencies and other techniques have been developed that are capable of superior resolution. One such technique is the aforementioned autoregressive (AR) technique.

AR spectrum estimation is based on modeling a process as the output of an all-pole filter $a_p$ whose input is drawn from unit variance white noise. This is equivalent to forming a linear combination of the past p data values to estimate a new data value for a $p^{th}$ order process where $a_p$ is the unknown weight vector which this algorithm determines, i.e., $$x(n) = -\sum_{k=1}^{p} a_p^*(k)x(n-k). \qquad (1)$$

Describing the problem in terms of spatial frequencies, which represent angles of arrival of plane waves impinging on a uniform line array, the estimation process can be written as $$-a_p^H X_p = d, \qquad (2)$$

where $X_p$ is a p×k matrix whose columns represent k different snapshots of the array and whose p row contain the measured values of the first p array elements from a length (p+1) array. ("Snapshot" refers to a sample of data taken in an instant in time, e.g., a window or frame of data, such that a plurality of snapshots can represent time series data.) The vector x is a 1×k row vector composed of the data at the $(p+1)^{th}$ array element for each of the snapshots. The problem can be thought of in terms of linear prediction where a linear combination of p elements is used to form an estimate for the $(p+1)^{th}$ array element. The full rank solution, which minimizes the squared error between the actual and predicted values, assuming k>p, is $$a_p = -(X_p X_p^H)^{-1} X_p x^H, \qquad (3)$$

which can be rewritten in the form of the Yule-Walker equations as $$a_p = -R_p^{-1} r_x, \quad (4)$$

where $$R_p = X_p X_p^H \quad (5)$$

is the correlation matrix, and $$r_x = X_p x^H \quad (6)$$

is the correlation vector.

The relationship in Equation 4 can be formulated as an augmented Wiener-Hopf equation via a couple of algebraic manipulations. First, multiply both sides of Equation 4 on the left by $R_p$, then add $r_x$ to both sides to obtain $$[r_x : R_p] \begin{bmatrix} 1 \\ a_p \end{bmatrix} = [0]. \quad (7)$$

Adding the mean squared prediction error $$\|\varepsilon\|^2 = \sigma_x^2 + r_x^H a_p \quad (8)$$

to the top row of Equation 7 yields $$\begin{bmatrix} \sigma_x^2 & r_x^H \\ r_x & R_p \end{bmatrix} \begin{bmatrix} 1 \\ a_p \end{bmatrix} = \begin{bmatrix} \|\varepsilon\|^2 \\ 0 \end{bmatrix}. \quad (9)$$

Let $a_{p+1}$ denote the augmented weight vector $a_{p+1} = [1 \ a_p^T]^T$. Solving Equation 9 for $a_{p+1}$ yields $$a_{p+1} = \begin{bmatrix} 1 \\ a_p \end{bmatrix} = \|\varepsilon\|^2 R_{p+1}^{-1} u_{p+1}, \quad (10)$$

where $$R_{p+1} = \begin{bmatrix} \sigma_x^2 & r_x^H \\ r_x & R_p \end{bmatrix}, \quad (11)$$

and $u_{p+1}$ is a (p+1)×1 unit vector whose first element is unity with the remaining elements zero. The correlation matrix is now of dimension (p+1)×(p+1) and represents all the array elements. Once $a_{p+1}$ has been found, it can be used in the power spectrum equation or power spectral density of an AR process:

$$P_x(\theta) = \frac{\|\varepsilon\|^2}{\|e_\theta^H a_{p+1}\|^2}, \quad (12)$$

where $e_\theta$ is a steering vector directed toward the angle $\theta$. For example, this steering vector can be a Fourier beamforming vector.

$$e_\theta = e^{jn\pi \sin \theta} \ 0 \leq n \leq p \quad (13)$$

In most applications of the full rank AR just discussed, there is a compromise concerning the order of prediction, i.e., the number of samples to be incorporated into a linear combination and hence the number of unknowns in the normal equations or the number of parameters needed to characterize the all-pole model. A larger p provides a more accurate spectral envelope, with the disadvantage of requiring more computation, resulting in greater delays, and where the signal is transmitted, more bits for the transmission of the prediction coefficients. There is also a risk of over-modeling the process, which can lead to false peaks in the power spectral density. On the other hand, selecting a value for p that is too small results in no correct peaks.

Reduced rank AR estimation is known to alleviate a number of the disadvantages of full rank AR methods. First, reduced rank AR estimation can, in some cases, avoid over-modeling a process which is known to be of reduced rank. Second, the number of snapshots required to estimate the process is reduced. A process residing in a low dimensional space needs fewer measurements to form a good estimate. Third, reduced rank AR methods are less computationally demanding than full rank methods. The solution to AR spectrum estimation essentially involves inverting a pth order correlation matrix. If the data can be compressed into an M-dimensional subspace, inverting the resulting lower dimensional covariance matrix requires less computation.

To provide an example, if only two signals are present, a three element array should be able to detect both signals, albeit at a very low resolution. Each additional element of an array increases the resolution but may also give an additional false noise peak. Reduced rank techniques ideally select a subspace that captures signal information while excluding a large portion of the noise. Such methods require a lower level of sample support because they estimate the data in a smaller subspace. Algorithms which require fewer samples to estimate the process's statistics are particularly helpful when working in non-stationary environments.

Reduced rank processing may be thought as projecting the data matrix $X_p$ into a reduced rank data space. The reduced rank data matrix is $$D_M = L_M L_M^H X_p, \quad (14)$$

where $L_M$ represents a matrix whose columns form an orthogonal basis that span the desired reduced subspace.

Using this new subspace data, the reduced rank AR weight vector can be calculated as $$a_p = -(D_M D_M^H)^\dagger D_M x^H \quad (15)$$

where † denotes the pseudo inverse.

Both the p-dimensional $\tilde{a}_M$ vector and the M-dimensional $\tilde{a}_M$ vector are termed "reduced rank vectors" since both were created in a subspace of rank M. Therefore, reduced rank AR spectrum estimation is the method of forming the best estimate of a pth order AR process in an M-dimensional subspace.

Two types of reduced rank AR estimators based on the principal eigenvectors of the data correlation matrix, i.e., principal component (PC)-AR, have been proposed in an effort to achieve the increased resolution of a high order full rank (FR)-AR model along with the fewer spurious peaks of the lower order FR-AR models. The first PC-AR method is a signal independent method which finds the eigenvectors of the $R_{p+1}$ correlation matrix and applies a reduced rank version of Equation 10. The second PC-AR method is signal dependent, which decomposes $R_p$ into its eigenvectors and uses a reduced rank version of Equation 4. Both PC-AR methods take advantage of the diagonalized covariance matrix found in an eigenvector subspace so that no additional transformations are necessary to compute the inverse.

A fundamental limitation of the reduced rank PC-AR techniques is the need to work in a subspace having a rank that exceeds the unknown signal rank. If the subspace rank selected is less than the number of spatial frequencies present, the PC-AR method provides very poor performance. Thus, one must either have advance knowledge of an upper limit of the number of frequencies present or select a relatively high signal subspace to ensure that its rank is greater than the unknown number of frequencies, such that the small degree of rank reduction provides little benefit. Further, the need to perform eigenvector decomposition, even in reduced rank, requires a significant amount of computation to perform the full covariance matrix eigenvector decomposition, introducing delays which, in some situations, may be critical where rapid results are required.

Accordingly, the need remains for a method for reduced rank AR estimation which does not suffer the performance drawbacks of existing reduced rank methods and which requires less computational resources and time. The system and method disclosed herein are directed to such a need.

SUMMARY OF THE INVENTION

It is an object of the present invention to provide a system and method for linear prediction which uses reduced rank autoregressive modeling.

A further object of the present invention is to provide a system and method for linear prediction which selects data which is most strongly correlated with the desired process.

Another object of the present invention is to provide a system and method for linear prediction that is nearly independent of knowledge about the signal rank.

Yet another object of the present invention is to provide a system and method for linear prediction with uses fewer channels and hence, less noise variance, than full rank techniques.

Another object of the present invention is to provide a system and method for linear prediction which requires less sample support as compared to full rank methods.

Yet another object of the present invention is to provide a system and method for linear prediction which requires less computation than full rank or other known reduced rank techniques.

Still another object of the present invention is to provide a system and method for spectral estimation using reduced rank autoregression.

The foregoing objects and other objects and advantages of the invention will become apparent from the following discussion thereof.

According to the present invention, the method for linear prediction of information determinable from at least one input signal containing a plurality of data points, includes training a linear prediction filter by providing at least one reference signal comprising reference data having known values; collecting observed data corresponding to the at least one reference signal; identifying a reduced order data space comprising a reduced order Krylov subspace between the observed data and the reference data; and maximizing mutual data points between the observed data and the reference data in the reduced order data space to define a weight for use in the linear prediction filter. In a preferred embodiment, the reduced order data space is identified by applying a multi-stage Wiener filter to the observed data.

In another aspect of the invention, the method for linear prediction of information determinable from at least one input signal having a plurality of data points includes: providing at least one reference signal having a plurality of reference data points having known values; training a filter by collecting p observed data points corresponding to p reference data points from the reference signal, where p reference data points are selected from the plurality of reference data points, and training further includes processing the p observed data points through the filter to identify a reduced order data space comprising a reduced order Krylov subspace between the observed data points and the reference data points; and defining a weight for minimizing the mean squared error between a predicted p+1 observed data point and a p+1 reference data point. The weight is applied to the filter which is then used for filtering data collected from the at least one input signal. In a preferred embodiment, the reduced order data space is identified by applying a multi-stage Wiener filter to the observed data.

In still another aspect of the invention, a digital signal containing data is input into a digital signal processor (DSP) which includes a filter for finding the weight vector that best estimates a received signal by minimizing the mean squared error. The input data is configured as an observed data matrix containing data samples collected from at least one reference signal, where the at least one reference signal has a set of known data points. A received data matrix is formed by collecting data samples collected from the at least one received signal. A weight vector is applied to the observed data matrix. This weight vector is determined by (a) performing a rank reduction transformation produced by decomposition of the observed data matrix in a multi-stage Wiener filter having a plurality of stages, each stage comprising projection onto two subspaces, wherein a first stage comprises projecting the observed data matrix onto each of an initial first subspace comprising an initial normalized cross-correlation vector comprising a correlation vector between a known data point from the set of known data points and the observed data points and an initial second subspace comprising the null space of the initial normalized cross-correlation vector, and each subsequent stage comprises projecting data transformed by the preceding second subspace onto each of a first subspace comprising a normalized cross-correlation vector at the previous stage and a second subspace comprising the null space of the normalized cross-correlation vector of the current stage; and (b) minimizing the mean squared error in the reduced rank data matrix. The weight vector is then applied to the received data matrix.

For applications to spectrum estimation the weight, or weight vector, is used in combination with the mean squared error to calculate the autoregressive power spectrum. Specifically, the Fourier transform of the weight vector is determined, then its absolute value is placed in the denominator of Equation 12, which calculation is well known in the art.

In one embodiment, the input signal is generated by a multi-element uniform line array detector upon detection of a plurality of plane waves impinging on the detector from different angles. The reduced rank AR algorithm disclosed herein operates on the input signal to estimate frequency, permitting identification of the angles of arrival of the plane waves.

BRIEF DESCRIPTION OF THE DRAWINGS

The embodiment(s) of the invention are described in the following Detailed Description with reference to the accompanying figures, wherein:

FIG. 7a shows the $P_D$ performance of the reduced rank AR estimation according to the present invention, FIG. 7b shows the $P_D$ performance of signal dependent PC-AR estimation, FIG. 7c shows the FAR performance of RR-AR according to the present invention, and FIG. 7d shows the FAR performance of signal dependent PC-AR;

DETAILED DESCRIPTION OF THE PREFERRED EMBODIMENT(S)

The following detailed description utilizes a number of acronyms which are generally well known in the art. While definitions are typically provided with the first instance of each acronym, for convenience, Table 1 below provides a list of the acronyms and abbreviations used herein along with their respective definitions.

TABLE 1

| ACRONYM | DEFINITION |
|---|---|
| AR | Autoregressive |
| FR | Full rank |
| PC | Principal component |
| RR | Reduced rank (per the present invention) |
| CRB | Cramer Rao bound |
| MWF | multi-stage Wiener filter |
| MUSIC | MUltiple SIgnal Classification |
| ULA | uniform line array |
| PSD | power spectrum density |
| AOA | angle of arrival |
| AOD | angle of departure |
| TOA | time of arrival |
| SAR | synthetic aperture radar |
| MUD | multi-user detection |
| IS | interference suppression |
| CDMA | code division multiple access |
| SIC | successive interference canceller |
| PIC | parallel interference canceller |
| DSP | digital signal processor |
| SNR | signal-to-noise ratio |
| $P_D$ | probability of detection |
| FAR | false alarm rate |
| ROC | receiver operator characteristic |

Figure 1:
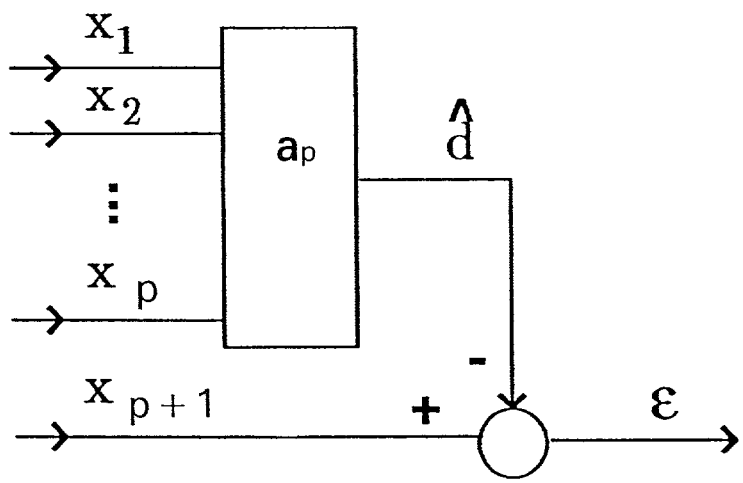
FIG. 1 is a diagram showing the filter structure for linear prediction.

The reduced rank AR (RR-AR) estimator according to the present invention uses a different subspace than that based on principal eigenvectors. (Note that other methods, including principal components methods, e.g., PC-AR, are also reduced rank methods. Nonetheless, for purposes of this description, the acronym "RR-AR" is intended to refer specifically to the inventive system and method disclosed herein.) The RR-AR method employs a training method in the Krylov subspace which maximizes the mutual information between the desired, or reference, signal and the data matrix using a filter structure as shown in FIG. 1 for linear prediction. Krylov subspace methods are well known in the art and have been used for iterative solution of large systems of linear equations, large-scale eigenvalue computations, and reduced-order modeling of large-scale linear dynamical systems. Briefly, a Krylov subspace is the subspace spanned by a Krylov sequence which is, for a given matrix A and vector x, the sequence of vectors $\{A^i x\}_{i \geq 0}$, or a finite initial part of this sequence.

For purposes of training the filter, typically embodied in a DSP (digital signal processor), for performing the RR-AR method, the collected data is taken from a signal having values which are known. In the training process, the filter output is compared to the reference signal and the weights are adjusted to minimize the error in the predicted value. The collected data are stored in an (p+1)×K matrix consisting of (p+1) array elements and K snapshots. The data from the $(p+1)^{th}$ element are represented by the 1×K array d. (Note that for notational clarity, d is now being used to designate vector x (lower case) which was first introduced in Equation 2 to avoid possible confusion with the large number of upper case X's in the following equations.) The previous p data values for each snapshot are represented by the matrix $X_p$; $\hat{a}_p$ denotes the estimate of the weight vector that yields the estimate $\hat{d} = \hat{a}_p^H X_p$ which minimizes the mean square error $\epsilon = d - \hat{d}$. A useful interpretation of the least squared weight vector $\hat{a}_p$ is that it represents the linear combination of the data $X_p$ that equals the desired (reference) signal d projected onto the data space $$\hat{a}_p^H X_p = d X_p^H (X_p X_p^H)^{-1} X_p. \tag{16}$$

Note that $X_p^H(X_p X_p^H)^{-1} X_p$ is the data space projection operator. Solving for $\hat{a}_p$ leads to the familiar least squares solution previously provided in Equation 3

$$\hat{w}_p = (X_p X_p^H)^{-1} X_p d^H. \tag{17}$$

Applying the Yule-Walker equations (see Equations 4–6) determines the filter to be applied to the entire data record $X_{p+1}$ to minimize the output error:

$$\hat{a}_{p+1} = \begin{bmatrix} 1 \\ \hat{a}_P \end{bmatrix}. \tag{18}$$

The reduced rank subspace used to determine the weight vector $\hat{a}_p$ is formed in the same stage by stage manner as for a multistage Wiener filter described by J. S. Goldstein, et al. in an article entitled "A Multistage *Representation of the Wiener Filter Based on Orthogonal Projections*", IEEE Transactions on Information Theory, Vol. 44, No. 7, November 1998, which is incorporated herein by reference. The multistage Wiener filter is the also disclosed in co-pending patent application Serial No. 09/933,004, filed Aug. 21, 2001, which is assigned to the assignee of the present invention, and which is incorporated herein by reference.

Figure 2:
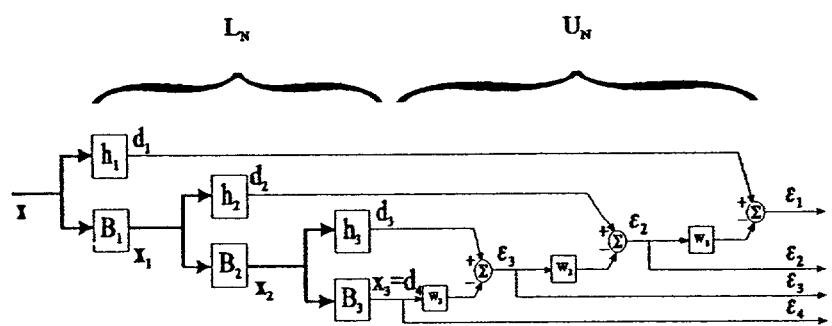
FIG. 2 is a diagram showing a nested chain of scalar Wiener filters based on orthogonal projections.

Briefly, the described Wiener filter performs a multistage decomposition where two substages are formed at each stage: one in the direction of the cross-correlation vector at the previous stage and one in the subspace orthogonal to this direction. Then, the data orthogonal to the cross-correlation vector is decomposed again in the same manner, stage by stage. This process reduces the rank, but not necessarily dimension, of the data vector at each stage. FIG. 2 illustrates a filter structure for N=4. The initial cross-correlation vector red, which is normalized to provide the first pivot $h_1$, is simply the correlation vector between, preferably, the desired process, or alternatively, the Nth array element d and the remaining array elements $X_p$:

$$r_{xd_0} = X_p d^H, \tag{19}$$

with the first pivot being $$h_1 = \frac{r_{xd_0}}{\|r_{xd_0}\|}. \tag{20}$$

The reference signal $d_i$ at each stage is generated by computing the component of the data from the previous stage along the normalized cross-correlation vector of the current stage:

$$d_i = h_i^H X_{i-1}, \; i=1 \ldots M. \tag{21}$$

The new data matrix $X_i$ is generated by projecting the data from the previous stage onto the space orthogonal to the previous stage's cross-correlation basis vector:

$$X_i = B_i X_{i-1}, \; i=1 \ldots M, \tag{22}$$

where $B_i$ is the null operator of $h_i$ and $X_0$ is the original p×K data matrix.

There are many different operators that span the null space of h. It has been determined shown, however, that a particular choice leads to greatly simplified analysis and computation of the weight vector. Therefore, in the preferred embodiment, the chosen form of the null operator is a blocking matrix $B = I - hh^H$, so that, $$X_i = B \, X_{i-1} = X_{i-1} - h d_{i-1}. \tag{23}$$

This reduces the number of operations from $O(N^2 K)$ to $O(NK)$ where O is the "order" corresponding to computational cost or flop count, K is the number of snapshots and N is the number of array elements.

The new data matrix generated according to Equation 22 is then correlated to form a new correlation vector $$r_{x_i d_i} = X_i d_i^H, \tag{24}$$

which is normalized to form the pivot vector for the next stage:

$$h_{i+1} = \frac{r_{x_i d_i}}{\|r_{x_i d_i}\|}. \tag{25}$$

The subspace that is selected by this progression of projections can be represented by the p×p projection operator $LL^H$ where:

$$L_M^H = \begin{bmatrix} h_1^H \\ h_2^H B_1 \\ h_{M-1}^H \prod_{i=M-2}^{1} B_i \\ h_M^H \prod_{i=M-1}^{1} B_i \end{bmatrix}. \tag{26}$$

This concludes the first part of the algorithm, which may also be referred to as the "analysis" filterbank, which projects the data into a subspace to form a new reduced rank data matrix $D = LL^H X_p$.

For the second part of the algorithm, in the preferred embodiment, the "synthesis" filterbank, is a Gram-Schmidt transformation $U_M$ which transforms a sequence of correlated values D into an uncorrelated sequence of prediction errors $E_M$, $$E_M = D_M U_M, \tag{27}$$

where the correlation matrix associated with $E_M$ is $$\Lambda = E_M^H E_M = \text{diag}(\epsilon_1, \epsilon_2, \ldots, \epsilon_M). \tag{28}$$

Using $E_M$ as a new representation for $D_M$ avoids taking the inverse of a non-diagonal matrix in computing the solution to $a_M$:

$$a_M = (E_M^H E_M)^{-1} E_M^H d \tag{29}$$

$$a_M = \Lambda^{-1} U_m^H D_M^H d. \tag{30}$$

The Gram-Schmidt operator $U_M$ that realizes the mapping of $D_M$ into $E_M$ is formed in a backwards recursive manner. The backwards recursion equations defining this sequence of operations are $$w_i = \xi_i^{-1} \|r_{x_i d_i}\| \quad (31)$$

$$\xi_i = \sigma_{d_i}^2 - \frac{w_{i+1}^H}{\|r_{x_1 d_i}\|}, \quad (32)$$

where $\xi_i$ represents the minimum mean square error at each stage and $\sigma_{d_i}^2 = h_i^H R_{x_{i-1}} h_i$. The entire transformation $U_M$ may be expressed explicitly in matrix form as follows:

$$U_M = \begin{bmatrix} 1 & -w_1^* & \cdots & (-1)^{M+1} \Pi_{i=1}^{M-1} w_i^* \\ 0 & 1 & \cdots & (-1)^M \Pi_{l=2}^{M-1} w_i^* \\ \vdots & & \ddots & \vdots \\ 0 & 0 & \cdots & -w_{M-1}^* \\ 0 & 0 & \cdots & 1 \end{bmatrix}. \quad (33)$$

The present invention is not intended to be limited to use of the Gram-Schmidt transformation. Alternate methods for finding the inverse of the reduced rank data matrix may be used, including determining its pseudo-inverse. Selection of a suitable alternative method is within the level of skill in the art.

The following examples are the results of simulations performed to illustrate applications of the system and method of the present invention to linear prediction and spectral estimation. Performance comparisons of the RR-AR predictor disclosed herein with one or more of PC-AR (signal dependent or signal independent), and FR-AR methods.

The objective of the following spectrum estimation examples is to identify the spatial frequencies corresponding to simulated plane waves impinging on a uniform line array. One performance metric, the probability of detection ($P_D$), is calculated as the ratio of the number of correctly identified signals over the number of actual arriving signals. A second metric, false alarm rate (FAR), is the ratio of the number of false alarms over the angle range in degrees. Another metric is the ROC, receiver operating characteristic, which compares $P_D$ with FAR as a function of detector threshold.

EXAMPLE 1

A plane wave impinging on a 50 element uniform line array (ULA). The array elements are spaced at half wavelength intervals and the angles of arrival are randomly selected from a non-repeating uniform distribution over the set of all resolvable angles, ranging from −90 degrees to 90 degrees. The signal-to-noise ratio (SNR) is 2 dB per element. Nine signals impinge upon the array from different angles. 100 snapshots are taken. The spectra generated by each of these algorithms are run through a detector that estimates the threshold for each spectrum. Any peaks above a certain threshold are considered detected. If any of these detected angles do not correspond to one of the original arrival angles, it is counted as a false alarm. If a true angle is not detected, it is counted as a miss. The $P_D$ and FAR are calculated and averaged over 500 trials. The performance as a function of rank is calculated with a sample covariance of 2 N samples.

Figure 3:
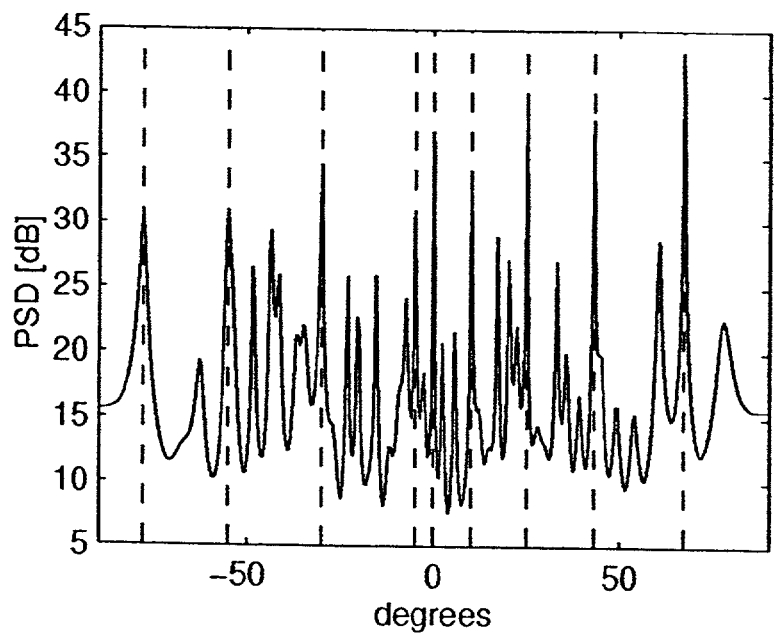
FIG. 3 is a plot of power spectral density versus angle of arrival for a full rank autoregression (FR-AR) estimation operating in a full rank 50 dimensional data space.
Figure 4:
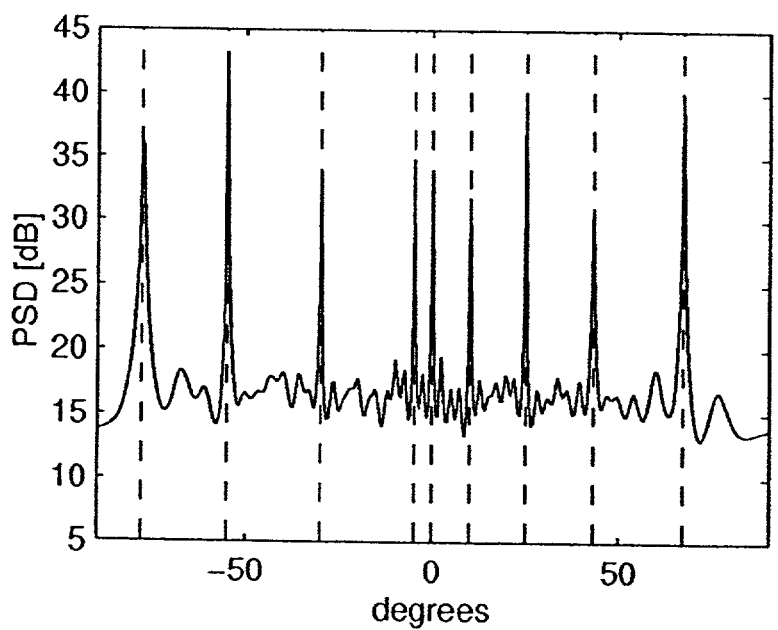
FIG. 4 is a plot of power spectral density versus angle of arrival for the reduced rank AR estimation according to the present invention operating in a rank 4 subspace.

Performance as a function of rank: A frequency estimator's performance is dependent upon the data space in which it operates. FIG. 3 is a plot of the FR-AR spectrum (power spectrum density (PSD) in dB versus angle of arrival (AOA)) operating in the full rank 50 dimensional data space for a single trial. The vertical dashed lines denote location of the true signals. Inspection of this plot reveals that the number of peaks exceeds the number of signals, leading to a significant number of potential false alarms. For example, for a threshold of 25 dB, there are nearly as many spurious peaks as there are actual signals. Comparing the FR-AR results to the RR-AR spectrum generated according to the present invention, shown in FIG. 4, the RR-AR spectrum provides more accurate estimation of the AOAs with fewer false alarms. (As in FIG. 3, the vertical dashed lines denote location of the true signals.) The RR-AR method of the present invention effectively isolates a subspace that precisely captures signal information while excluding a large portion of the noise subspace, resulting in enhanced detection and better noise rejection. (In general, reduced rank methods, including the inventive RR-AR method, will exhibit superior $P_D$ and FAR when compared with FR-AR for noisy or low sample support environments when averages over many trials.) It should be noted that a rank 4 subspace is optimum for detecting nine signals in this example.

Figure 5:
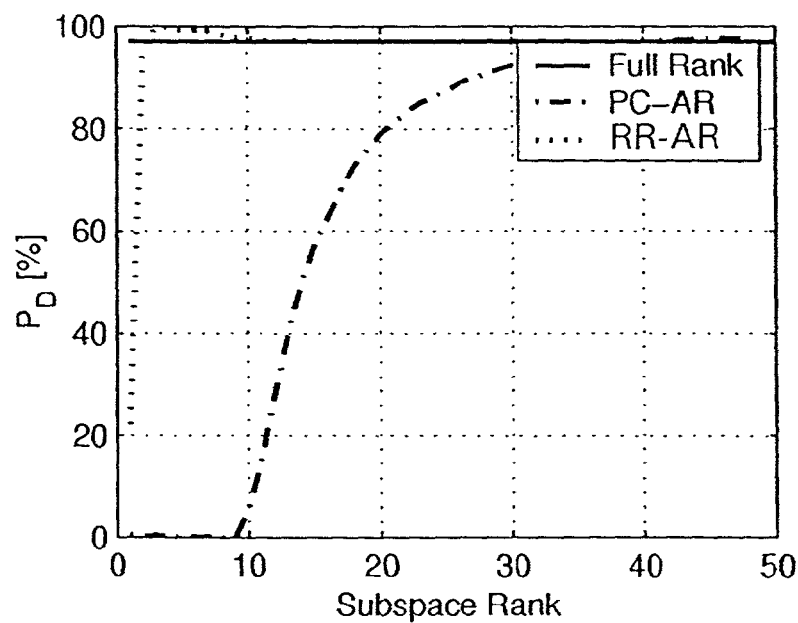
FIG. 5 is a plot of probability of detection ($P_D$) versus rank of the weight vector for each of FR-AR, signal dependent PC-AR and the reduced rank AR estimation according to the present invention.
Figure 6:
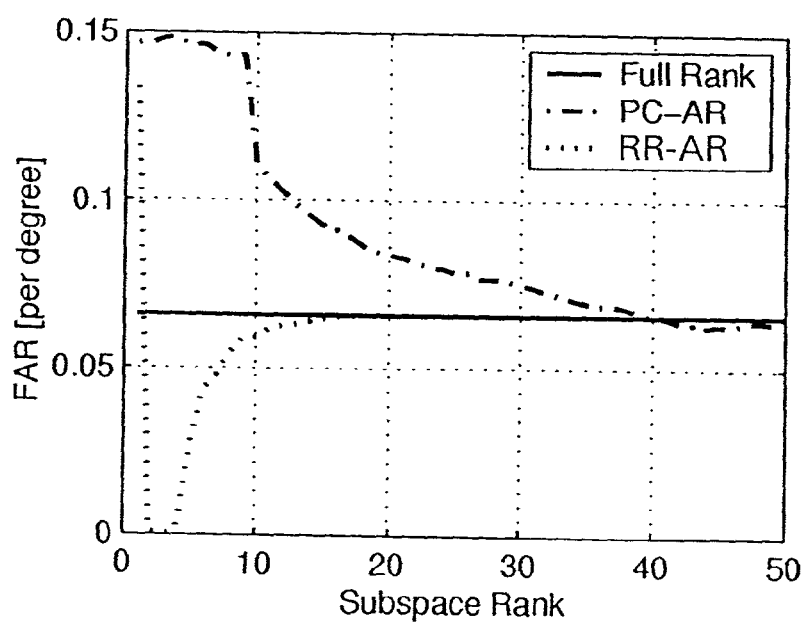
FIG. 6 is a plot of false alarm rate (FAR) versus rank of the weight vector for each of FR-AR, signal dependent PC-AR and the reduced rank AR estimation according to the present invention.

FIGS. 5 and 6 show the probability of detection ($P_D$) and false alarm rate (FAR), respectively, calculated over 500 trials for each of the full rank (FR)-, signal independent principal component (PC)- and RR-AR estimation techniques. In FIG. 5, the RR-AR $P_D$ is higher than that of FR-AR for very low rank subspaces. For those same low rank subspaces, FIG. 6 shows that the RR-AR method has a lower FAR. In fact, almost any subspace rank chosen by the RR-AR method will meet or exceed FR-AR performance in either $P_D$ or FAR. The PC-AR method clearly does not perform as well due to its requirement of much higher rank data space in order to obtain acceptable results. At rank 45, PC-AR has a slightly lower FAR than FR-AR due to its reduced rank modeling of the process. However, as a result of its need for higher rank data space, PC-AR cannot suppress spurious peaks as well as the RR-AR method, and therefore, its $P_D$ and FAR are not very good. It is also interesting to note that there is a much smaller range of suitable subspace ranks at which PC-AR performance is comparable to that of FR-AR.

EXAMPLE 2

Figure 7B:
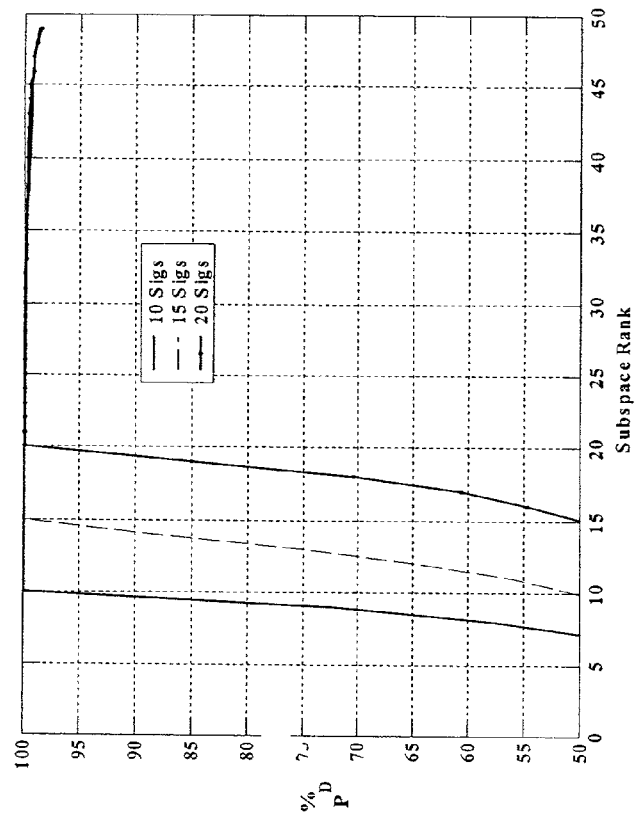
FIGS. 7a–7d are plots of probability of detection and FAR versus subspace rank of the weight vector for cases where there are 10, 15 and 20 signals present, where
Figure 7A:
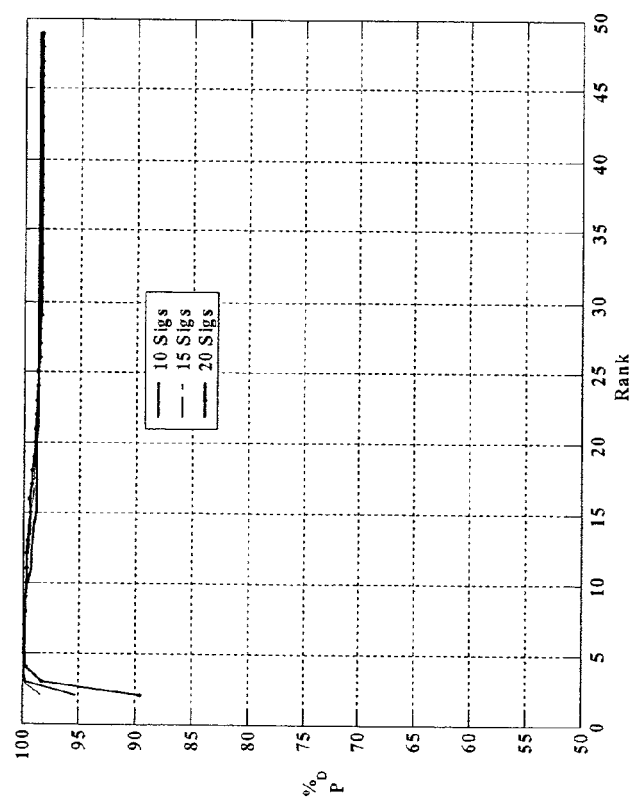
Figure 7C:
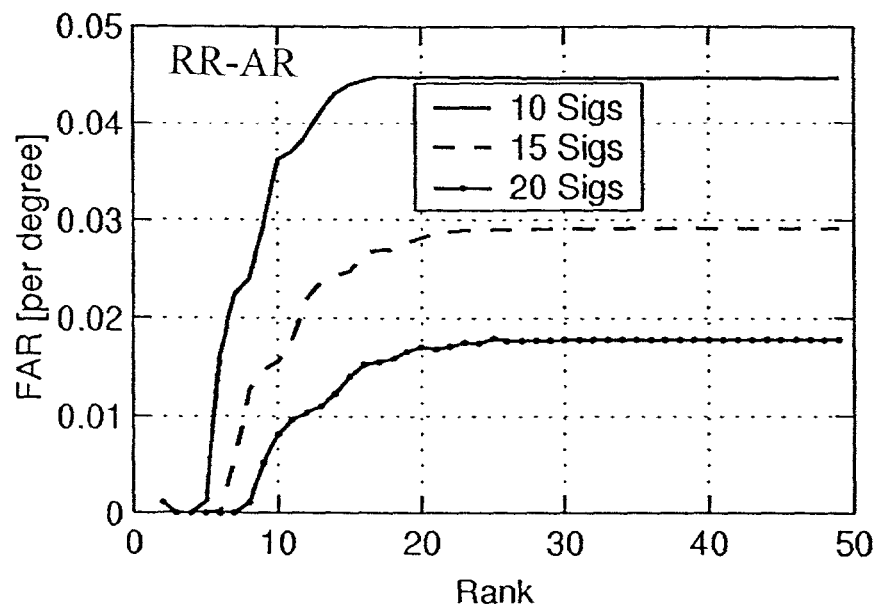
Figure 7D:
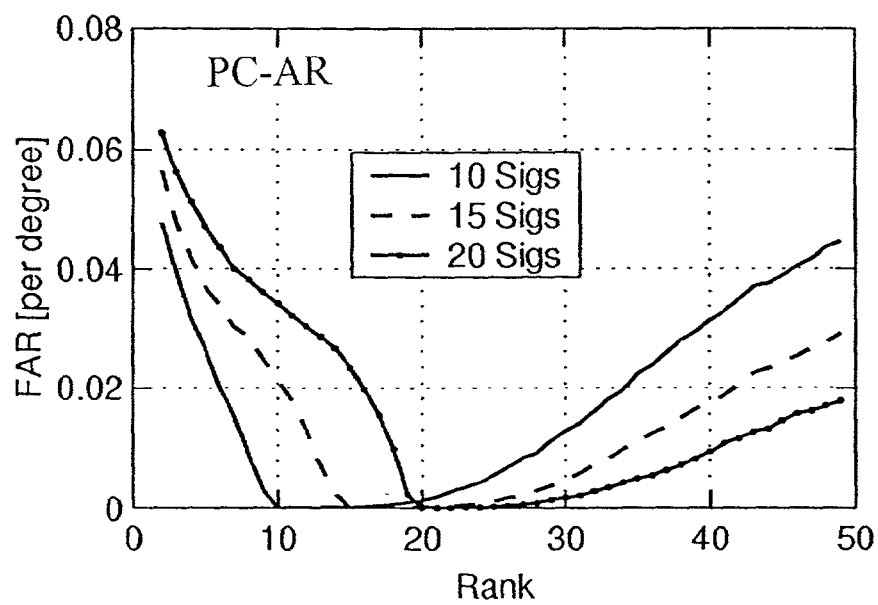

In this simulation, differing signal quantities (10, 15 and 20 signals) impinge on a 50 element ULA at 0 dB SNR. FIG. 7a shows the RR-AR method's robustness to rank selection in the sense that its $P_D$ will meet or exceed the $P_D$ of FR-AR at almost any rank, regardless of how many signals are present. (Note that the FR-AR performance corresponds to the RR-AR performance at rank 50.) The signal dependent PC-AR method, shown in FIG. 7b, has similar peak performance but requires a subspace rank greater than or equal to the signal rank before good results are achieved. Further examination of FIG. 7a reveals that the peak $P_D$ for the RR-AR method is nearly invariant to the signal rank. In other words, selecting one low subspace rank will yield excellent $P_D$ for a wide range of frequencies present. This is in direct contrast to signal dependent PC-AR, where the peak $P_D$ as a function of subspace rank is directly tied to the number of spatial frequencies. The near invariance of the RR-AR method to subspace signal rank selection can provide significant performance robustness when the signal rank is not known a priori. FIGS. 7c and 7d show similar trends for FAR.

EXAMPLE 3

Figure 8B:
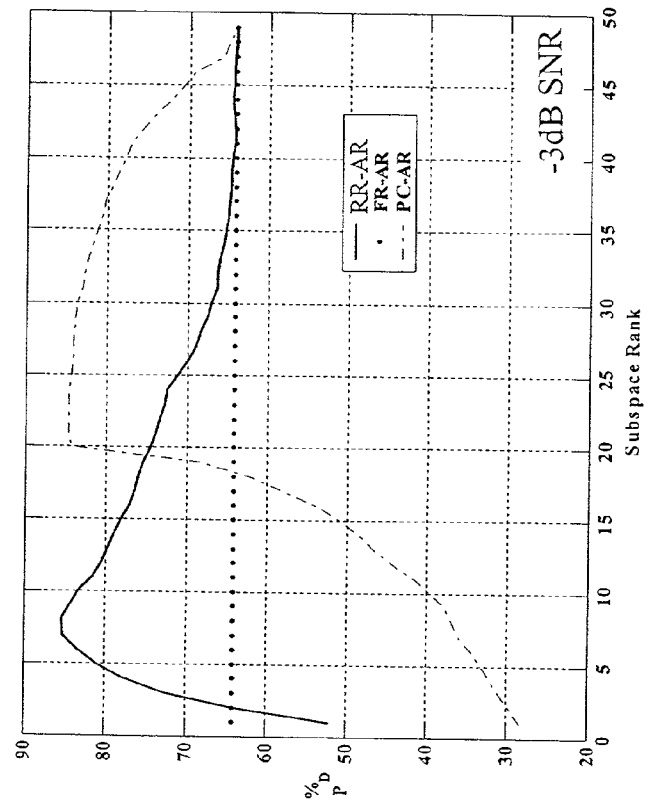
FIGS. 8a–8c are plots of probability of detection versus rank for 0 dB SNR, −3 dB SNR, and 3 dB, respectively, for each of FR-AR, signal dependent PC-AR and the reduced rank AR estimation according to the present invention.
Figure 8A:
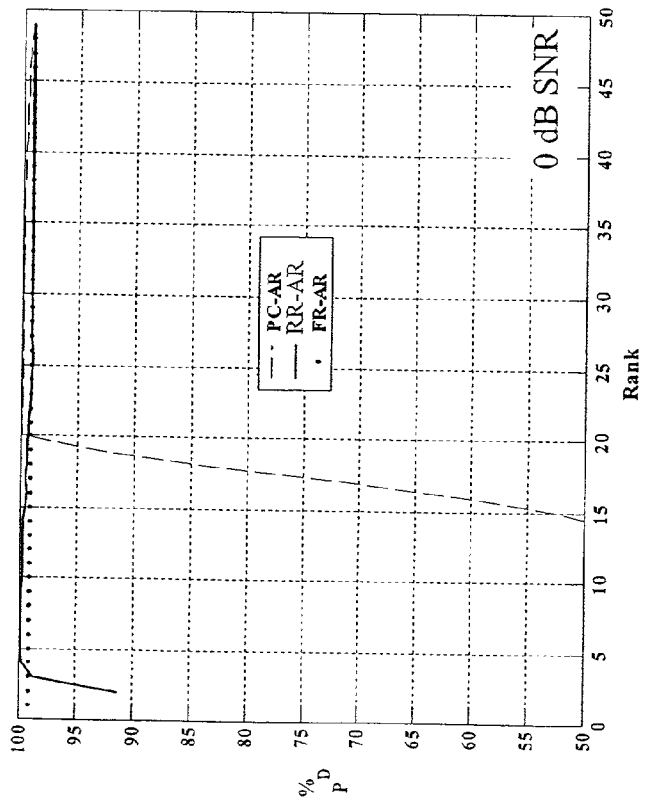
Figure 8C:
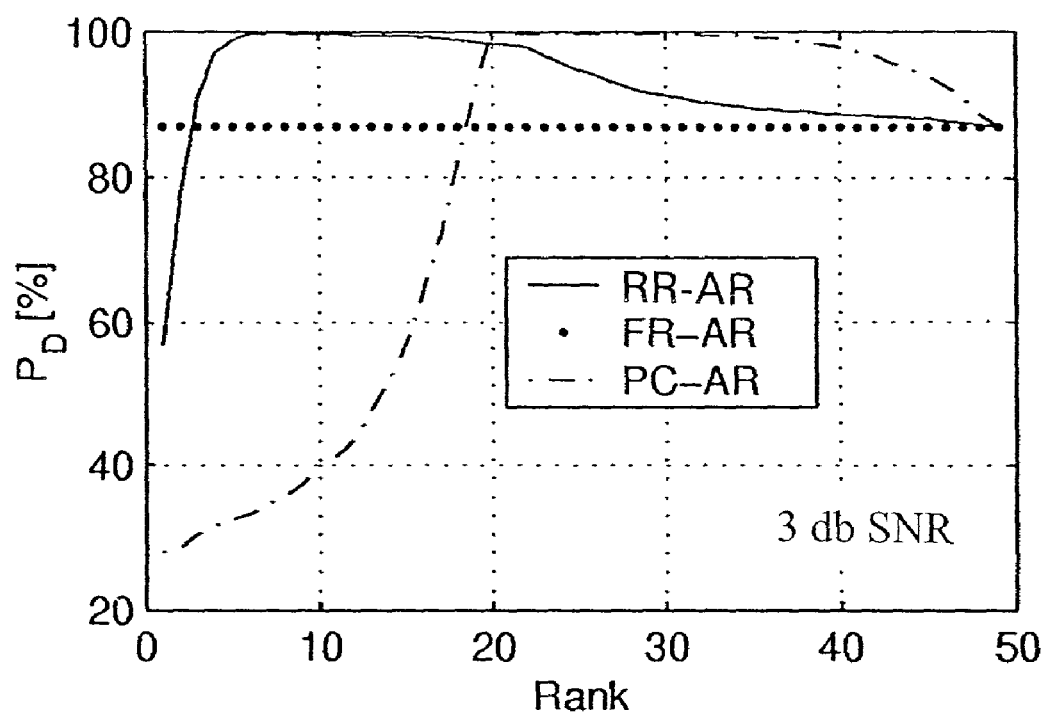

Performance as a function of SNR: To illustrate relative performance in low SNR environments, the simulation processes twenty signals received by a 50 element ULA. FIG. 8a–8c are plots of $P_D$ versus rank at different signal to noise ratios. As can be seen, FR-AR suffers greater degradation in $P_D$ in conditions of decreased SNR compared to the peak performances of signal dependent PC-AR and RR-AR. The same trends occur with FAR. These plots highlight the ability of reduced rank algorithms to focus on a subspace that captures the signal information while excluding a large portion of the noise, leading to enhanced $P_D$ and FAR. It is interesting to note that the RR-AR lower ranked subspace and the PC-AR higher rank subspace achieve roughly the same $P_D$ and FAR for the spatial frequencies used in the simulation. This may indicate that the relationship between a lower ranked subspace and a lower FAR is not as direct when the subspace rank is compressed below the signal rank.

Performance as a function of Sample Support: The fewer samples an algorithm requires to correctly estimate the frequencies, the more accurately it can track time-varying statistics. Reduced rank methods naturally require less sample support because they are estimating a smaller data space.

EXAMPLE 4

Figure 9:
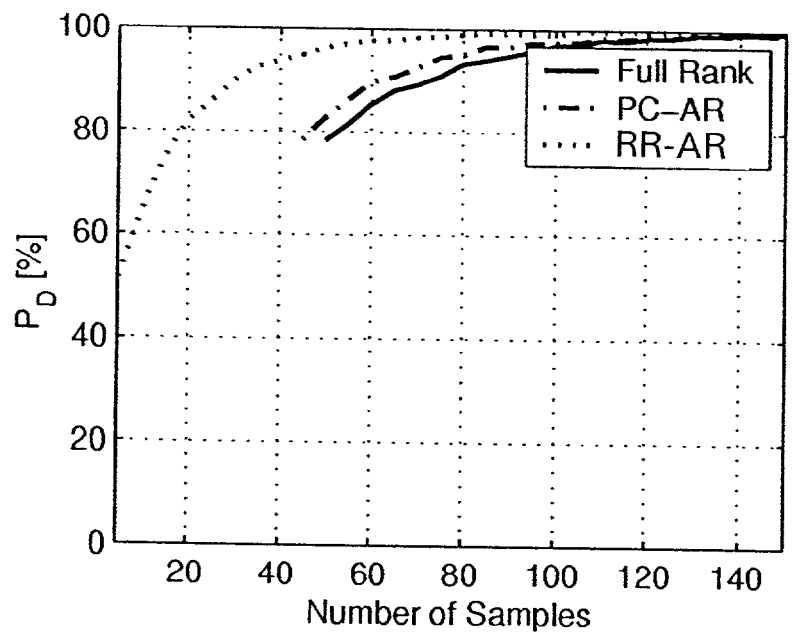
FIG. 9 is a plot of probability of detection versus sample support for each of FR-AR, signal independent PC-AR and the reduced rank AR estimation according to the present invention.
Figure 10:
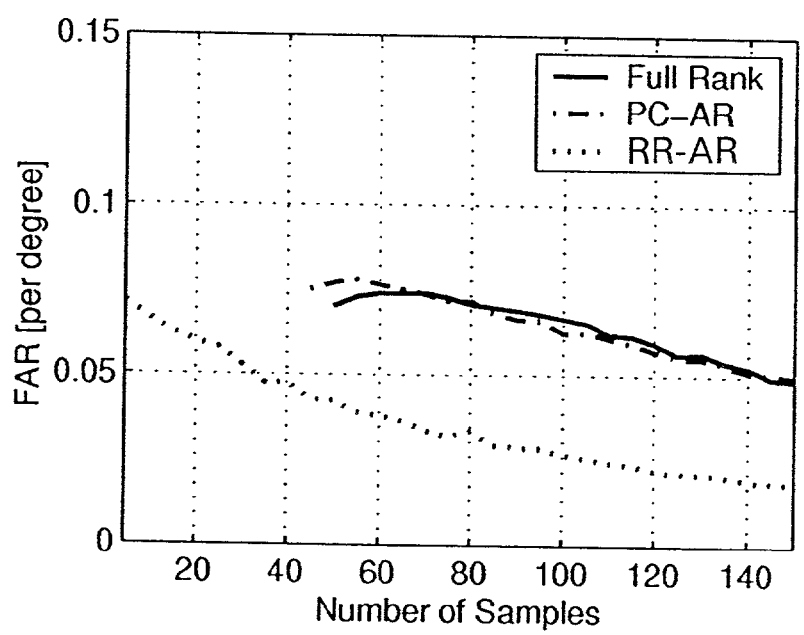
FIG. 10 is a plot of false alarm rate versus sample support for each of FR-AR, signal independent PC-AR and the reduced rank AR estimation according to the present invention.

In this simulation, 9 signals impinge upon a 50 element ULA. The SNR for each element is −7 dB. Averaging was performed over 500 trials. The RR-AR method was performed at rank 4 while the PC-AR method used a rank of 45, selected based on best performance. FR-AR had a rank of 50. As can be seen in FIG. 9, the $P_D$ for RR-AR requires many fewer samples to obtain the same performance levels as the other spectrum estimators. The dramatic reduction in sample support is not as apparent in signal independent PC-AR since it requires almost full rank (45/50) to accurately estimate the weight vector. Therefore, signal independent PC-AR is not able to exploit the reduced sample support requirements in a reduced rank subspace. FIG. 10 is a plot of FAR as a function of sample size, showing that RR-AR requires far fewer samples to obtain a low FAR.

By comparing the respective plots, it can be seen that while the RR-AR performance may be slightly degraded with lower sample support, its performance is less affected than the other methods, which clearly require a larger data rank.

EXAMPLE 5

Figure 11:
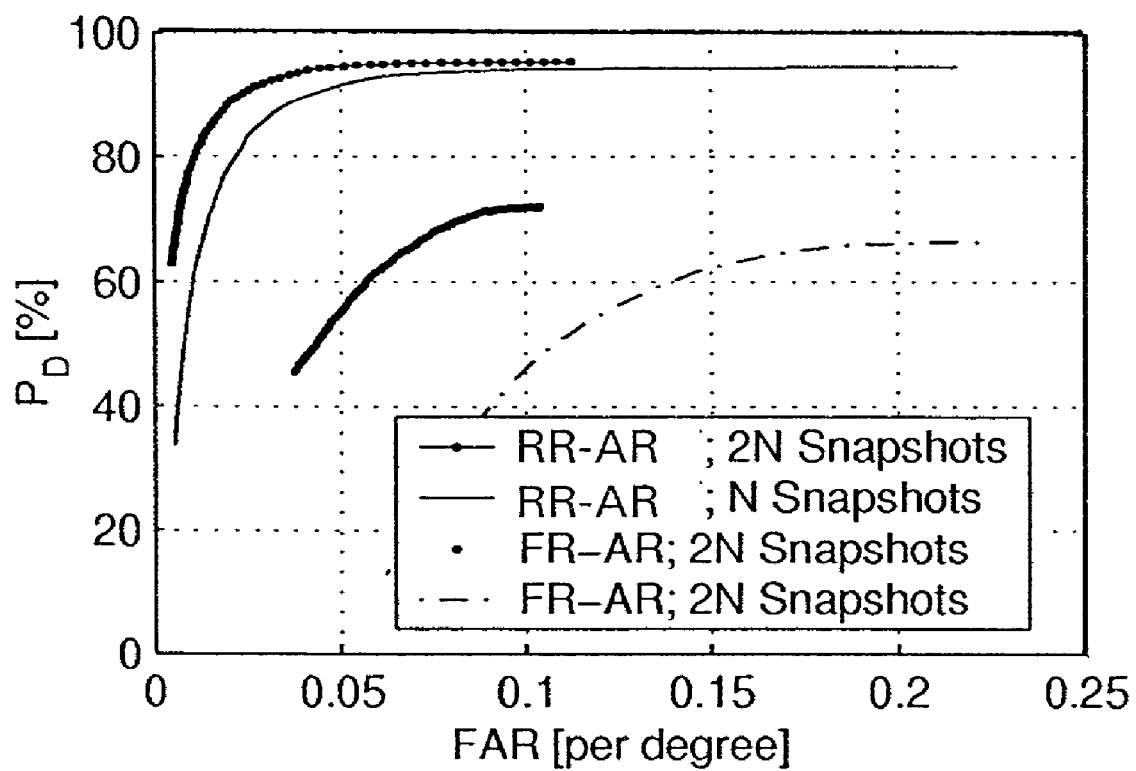
FIG. 11 is a plot of probability of detection versus FAR for different sample sizes (N and 2N) comparing FR-AR and the reduced rank AR estimation according to the present invention.

Twenty signals impinge upon a 50 element ULA at 0 dB per element. 500 trials were averaged. RR-AR uses a subspace rank of 7. The ROC curves plotted in FIG. 11 compare the robustness of performance of RR-AR and FR-AR with both N and 2 N snapshots. (The performance of PC-AR with its optimum subspace rank selected was equivalent to that of RR-AR and, therefore, PC-AR is not plotted.) As indicated, the overall performance of the RR-AR method is less affected than is FR-AR by a reduction from 2 N to N snapshots.

Figure 12A:
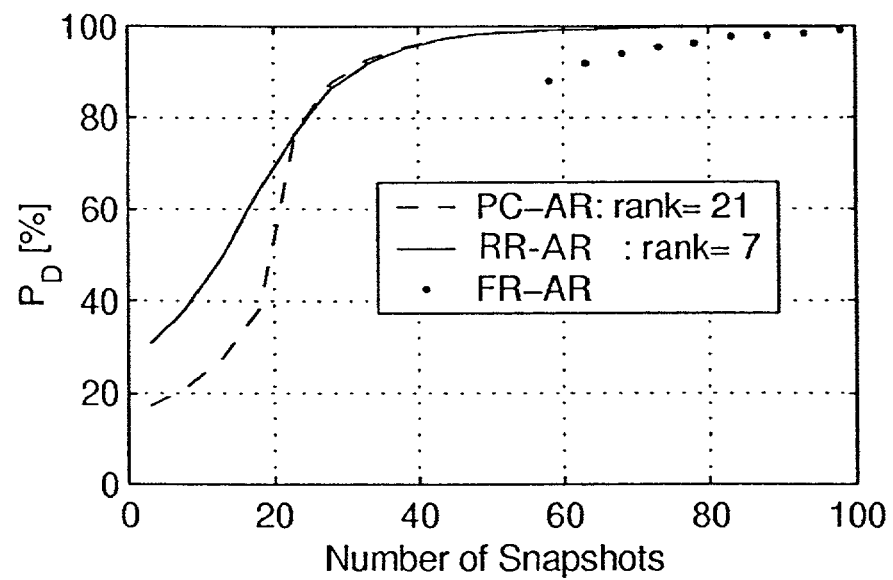
FIGS. 12a and 12b are plots of probability of detection and false alarm rate, respectively, versus sample support at 0 dB for FR-AR, signal dependent PC-AR and the reduced rank AR estimation according to the present invention.
Figure 12B:
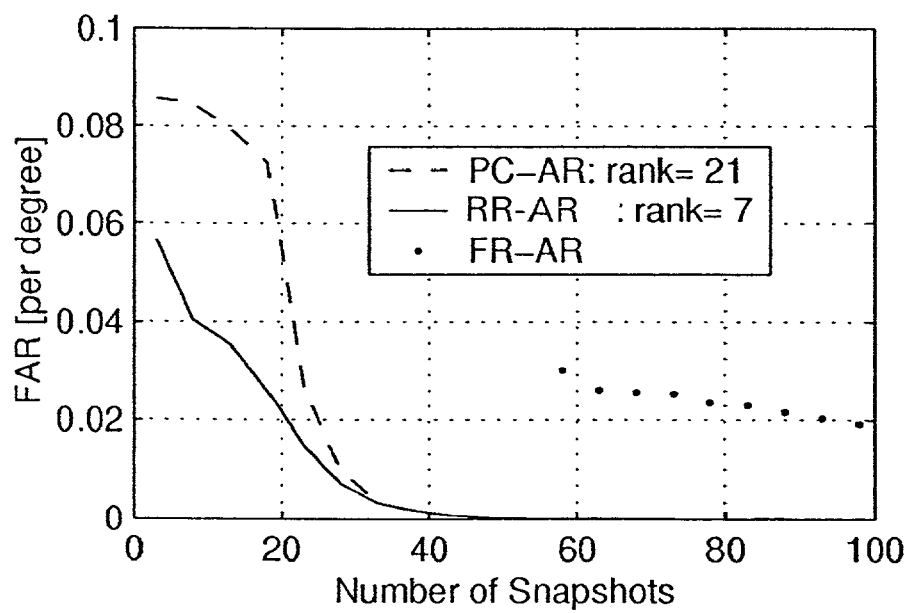

FIGS. 12a and 12b are plots comparing performance of FR-AR, signal dependent PC-AR and RR-AR with sample support. Here, the subspace rank for signal dependent PC-AR is selected to be less than optimum, in this case, 21. These plots demonstrate that both reduced rank algorithms (PC-AR and RR-AR) require twice the number of snapshots as spatial frequencies present in order to achieve good detection performance. It is interesting to note that although PC-AR requires a subspace rank three times that of RR-AR, it does not need a significantly greater number of snapshots to achieve the same performance in very low sample support environments. FR-AR needs at least 50 snapshots to form and invert the full rank data covariance matrix. Therefore, the performance curve for FR-AR does not start until after 50 snapshots.

The RR-AR system and method of the present invention are illustrated in terms of their application to spectrum estimation. Spectrum estimation techniques can be used in wireless systems including applications to AOA (angle of arrival) estimation and TOA (time of arrival) estimation. For TOA estimation, it is known to define the problem as finding the impulse response of a channel based on correlation with the desired (known reference) signal and the received signal. Super-resolution is then performed in the frequency domain to generate delays in the time domain. Such techniques are in commercial use using root-MUSIC for TOA estimation, however, in multi-path environments, correlation-based TOA techniques are limited in resolution since they are only able to resolve correlation peaks down to a single chip delay. The RR-AR estimator can be applied to frequency domain-correlated data to determine a super-resolution TOA estimate by resolving peaks down to less than one-third of a chip period, thus improving timing estimates. This technique can be applied in conjunction with AOA estimation to perform joint TOA/AOA estimation.

The RR-AR estimator of the present invention can be used for multi-user detection (MUD) or interference suppression (IS) of CDMA signals. The advantages of reduced rank IS using the RR-AR estimator include that (1) there is no requirement of advance knowledge of the number of signals; (2) it can be used to estimate the Doppler frequency, or frequency of arrival, of the signal; (3) computational complexity is significantly reduced; (4) filter weights can be quickly adapted to time-varying channel conditions; (5) it can be used with any technique that also employs linear processing including space time codes, RAKE diversity processing and blind channel deconvolution; and (6) it can be embedded into non-linear schemes such as SIC/PIC (successive/parallel interference cancellers) for improved performance.

The RR-AR estimator of the present invention can also be used in modeling of spectra generated in chromatographic and spectrographic analytical techniques. Typically, the measurements generated in such techniques consist of energy spectra in which specific peaks, or groups of peaks, are associated with certain elements or compounds. Regression methods, including principal components methods, are widely used in industry for determination of bulk properties or concentrations of materials.

Still another application of the RR-AR estimator of the present invention is as a linear predictor for use in speech coding and synthesis. In such applications, the received signal may be a carrier signal with encoded speech. Speech is encoded using the RR-AR estimator to identify a linear combination of previous signal values which can predict the next signal value. A set of linear prediction coefficients are determined by minimizing the mean squared error.

RR-AR estimator disclosed herein provides the ability to process data in a rapidly changing environment and the ability to perform spectrum estimation with super-resolution while simultaneously providing reduced complexity.

Other embodiments, applications and modifications of the present invention may occur to those of ordinary skill in the art in view of these teachings. Therefore, the scope of the invention is to be limited only the appended claims which include all other such embodiments and modifications when viewed in conjunction with the above specification and accompanying drawings.

What is claimed is:

1. In a method for linear prediction of information determinable from at least one input signal comprising a plurality of data points, a method for training a linear prediction filter comprising:
   providing at least one reference signal comprising reference data having known values;
   collecting observed data corresponding to the at least one reference signal;
   identifying a reduced order data space comprising a reduced order Krylov subspace between the observed data and the reference data; and
   maximizing mutual data between the observed data and the reference data in the reduced order data space to define an autoregressive weight for use in the linear prediction filter.

2. The method of claim 1, wherein the step of identifying a reduced order data space comprises applying a multi-stage Wiener filter to the observed data.

3. The method of claim 1, wherein each of the at least one input signal and the at least one reference signal comprises a plurality of signals received at a multi-element detector array so that each element of the array provides a data point, and wherein the information comprises signal characteristics of the plurality of signals.

4. The method of claim 3, wherein the plurality of signals arrive at the array at a plurality of different angles and the information comprises angle of arrival.

5. The method of claim 3, wherein the reduced rank has a value that is much smaller than the number of elements in the array.

6. The method of claim 1, wherein the information comprises a frequency spectrum.

7. The method of claim 1, wherein the reduced rank is much smaller than the quantity of data points.

8. The method of claim 1, wherein the step of collecting observed data comprises collecting a plurality of snapshots of the at least one reference signal.

9. The method of claim 1, wherein the plurality of snapshots comprises time series data.

10. The method of claim 1, further comprising generating an error vector using the reduced rank data matrix.

11. The method of claim 10, wherein the error vector is generated by performing a Gram-Schmidt transformation on the reduced rank data matrix.

12. The method of claim 1, wherein the autoregressive weight is defined by minimizing the mean squared error.

13. The method of claim 12, wherein the information to be predicted comprises an estimated spectrum and further comprising using the autoregressive weight and the mean squared error to calculate the estimated spectrum.

14. A method for linear prediction of information determinable from at least one input signal comprising a plurality of data points, the method comprising:
   providing at least one reference signal comprising a plurality of reference data points having known values;
   training a filter by collecting p observed data points corresponding to p reference data points from the reference signal, wherein p reference data points comprise a portion of the plurality of reference data points, wherein training further comprises
   processing the p observed data points through the filter to identify a reduced order data space comprising a reduced order Krylov subspace between the observed data points and the reference data points; and
   defining a weight for minimizing the mean squared error between a predicted p+1 observed data point and a p+1 reference data point; and applying the weight to filter the at least one input signal.

15. The method of claim 14, wherein the step of processing the p observed data points to identify a reduced order data space comprises applying a multi-stage Wiener filter to the observed data.

16. The method of claim 14, wherein each of the at least one input signal and the at least one reference signal comprises a plurality of signals received at a multi-element detector array so that each element of the array provides a data point, and wherein the information comprises signal characteristics of the plurality of signals.

17. The method of claim 16, wherein the plurality of signals arrive at the array at a plurality of different angles and the information comprises angle of arrival.

18. The method of claim 16, wherein the reduced rank has a value that is much smaller than the number of elements in the array.

19. The method of claim 14, wherein the information comprises a frequency spectrum.

20. The method of claim 14, wherein the reduced rank is much smaller than the quantity of data points.

21. The method of claim 14 wherein collecting observed data comprises collecting a plurality of snapshots of the at least one reference signal.

22. The method of claim 14, wherein the plurality of snapshots comprises time series data.

23. A method for linear prediction of information determinable from at least one signal received at a receiver adapted for receiving a set of data points, the at least one signal containing a plurality of data samples, the method comprising:
   defining an observed data matrix comprising observed data samples collected from at least one reference signal received at the receiver, the at least one reference signal having a set of known data points;
   defining a received data matrix comprising data samples collected from the at least one received signal;
   applying a weight vector to the observed data matrix, the weight vector comprising:
   (a) performing a rank reduction transformation produced by decomposition of the observed data matrix in a multi-stage Wiener filter having a plurality of stages, each stage comprising projection onto two subspaces, wherein a first stage comprises projecting the observed data matrix onto each of an initial first subspace comprising an initial normalized cross-correlation vector comprising a correlation vector between a known data point from the set of known data points and the observed data points in the receiver and an initial second subspace comprising the null space of the initial normalized cross-correlation vector, and each subsequent stage comprises projecting data transformed by the preceding second subspace onto each of a first subspace comprising a normalized cross-correlation vector at the previous stage and a second subspace comprising the null space of the normalized cross-correlation vector of the current stage;

(b) minimizing the mean squared error in the reduced rank data matrix; and applying the weight vector to the received data matrix.

24. The method of claim 23, wherein each of the at least one input signal and the at least one reference signal comprises a plurality of signals received at a multi-element detector array so that each element of the array provides a data point, and wherein the information comprises signal characteristics of the plurality of signals.

25. The method of claim 24, wherein the plurality of signals arrive at the array at a plurality of different angles and the information comprises angle of arrival.

26. The method of claim 24, wherein the reduced rank has a value that is much smaller than the number of elements in the array.

27. The method of claim 23, wherein the information comprises a frequency spectrum.

28. The method of claim 23 wherein the reduced rank is much smaller than the quantity of data points.

29. The method of claim 23, wherein the step of collecting observed data comprises collecting a plurality of snapshots of the at least one reference signal.

30. The method of claim 29, wherein the plurality of snapshots comprises time series data.

31. The method of claim 23, wherein the step of collecting received data comprises collecting a plurality of snapshots of the at least one received signal.

32. The method of claim 23, wherein the plurality of snapshots comprises time series data.

33. The method of claim 23, further comprising generating an error vector using the reduced rank data matrix.

34. The method of claim 33, where generating an error vector comprises performing a Gram-Schmidt transformation on the reduced rank data matrix.

35. The method of claim 23, wherein the information is an estimate of the spectrum of the at least one received signal.

36. A system for linear prediction of information determinable from at least one signal comprising a plurality of data points, the system comprising:

a linear prediction filter for processing a plurality of data samples collected from the at least one signal, the linear prediction filter comprising a multi-stage Wiener filter for projecting a full rank data matrix formed from the plurality of data samples and the plurality of data points into a subspace having a reduced rank to form a reduced rank data matrix and minimizing the mean squared prediction error in the reduced rank data space, and for applying a weight vector to the at least one signal to generate a predicted signal.

37. The system of claim 36, further comprising a receiver for receiving the at least one signal, the receiver comprising a plurality of elements in an array, each element generating a data point of the plurality of data points for each of the plurality of data samples.

38. The system of claim 36, wherein the predicted signal comprises an estimated spectrum.

39. The system of claim 36, wherein the at least one signal comprises a plurality of signals impinging at a plurality of angles on a detector array comprising a plurality of elements, wherein the information comprises angle of arrival.

40. The system of claim 36 wherein the filter and the processor are incorporated in a digital signal processor.

41. A method for spectrum estimation of at least one signal received at a detector comprising at least one detector element, the method comprising:

collecting a plurality of data snapshots from the at least one received signal;

defining a data matrix comprising the plurality of data snapshots;

applying a weight to the data matrix, the weight comprising:

(a) performing a rank reduction transformation produced by decomposition of the data matrix in a multi-stage Wiener filter having a plurality of stages, each stage comprising projection onto two subspaces, wherein a first stage comprises projecting the data matrix onto each of an initial first subspace comprising an initial normalized cross-correlation vector comprising a correlation vector between a known reference process and the remaining data points in the receiver and an initial second subspace comprising the null space of the initial normalized cross-correlation vector, and each subsequent stage comprises projecting data transformed by the preceding second subspace onto each of a first subspace comprising a normalized cross-correlation vector at the previous stage and a second subspace comprising the null space of the normalized cross-correlation vector of the current stage;

(b) minimizing the mean squared error in the reduced rank data matrix; and using the weight and the mean squared error to define an autoregressive power spectrum.

42. The method of claim 41, wherein the at least one received signal comprises a plurality of signals received by a detector array having a plurality of detector elements wherein one detector element receives one data point for each of the plurality of data samples.

43. The method of claim 42, wherein the reduced rank has a value that is much smaller than the number of elements in the array.

44. The method of claim 41, wherein the plurality of signals arrive at the array at a plurality of different angles and the information comprises angle of arrival.

45. The method of claim 41, wherein the step of minimizing mean squared error comprises generating an error vector by performing a Gram-Schmidt transformation on the reduced rank data matrix.

46. The method of claim 41, wherein the reduced rank is much smaller than the quantity of data points.

47. The method of claim 41, wherein the step of collecting data samples comprises collecting a plurality of snapshots of the at least one signal.

48. The method of claim 41, further comprising generating an error vector using the reduced rank data matrix.

49. The method of claim 48, where generating an error vector comprises performing a Gram-Schmidt transformation on the reduced rank data matrix.

50. A method for spectrum estimation in at least one input signal received at a detector comprising at least one detector element, the method comprising:

collecting a plurality of snapshots of the at least one input signal, each snapshot comprising a plurality of observed data points;

defining a observed data matrix comprising the plurality of snapshots;

identifying a reduced order data space comprising a reduced order Krylov subspace between the observed data points and reference data from a known reference signal;

maximizing mutual data points between the observed data points and the reference data in the reduced order data space to define an autoregressive weight; and using the autoregressive weight to calculate an estimated spectrum.

51. The method of claim 50, wherein the autoregressive weight is defined by minimizing the mean squared error.

52. The method of claim 50, wherein the at least input signals comprises a plurality of signals arriving at the array at a plurality of different angles and the estimated spectrum includes an angle of arrival for each of the plurality of signals.

53. A system for spectrum estimation in at least one input signal comprising a plurality of data points received at a detector comprising at least one detector element, the system comprising:

a filter for processing a plurality of data samples collected from the at least one signal, the filter comprising a multi-stage Wiener filter for projecting a full rank data matrix formed from the plurality of data samples and the plurality of data points into a subspace having a reduced rank to form a reduced rank data matrix and determining a weight for minimizing the mean squared error in the reduced rank data space; and a processor for calculating an estimated spectrum using the weight and the mean squared error.

54. The system of claim 53, further comprising a receiver for receiving the at least one signal, the receiver comprising a plurality of elements in an array, each element generating a data point of the plurality of data points for each of the plurality of data samples.

55. The system of claim 53 wherein the filter and the processor are incorporated in a digital signal processor.

* * * * *

UNITED STATES PATENT AND TRADEMARK OFFICE
CERTIFICATE OF CORRECTION

PATENT NO. : 7,103,537 B2
APPLICATION NO. : 09/974091
DATED : September 5, 2006
INVENTOR(S) : Hanna Elizabeth Witzgall and Jay Scott Goldstein It is certified that error appears in the above-identified patent and that said Letters Patent is hereby corrected as shown below:

On Title Page, IN THE REFERENCES CITED (56) - OTHER PUBLICATIONS -

In Page 2, Column 2, Line 3, please change "tation of the Wiener Based on Orthogonal Projections, IEEE Trans-" to -- tation of the Wiener Filter Based on Orthogonal Projections, IEEE Trans- --

Signed and Sealed this

Fifth Day of December, 2006

JON W. DUDAS
*Director of the United States Patent and Trademark Office*